Dec. 18, 1928.   1,696,059

J. SCHRANER

TIRE

Filed June 3, 1927

John Schraner,
INVENTOR

BY Victor J. Evans
ATTORNEY

Patented Dec. 18, 1928.

1,696,059

UNITED STATES PATENT OFFICE.

JOHN SCHRANER, OF TELL CITY, INDIANA.

TIRE.

Application filed June 3, 1927. Serial No. 196,330.

The object of this invention is the provision of a spring influenced tire for automobiles or like vehicles, which will afford the wheel on which it is arranged a resiliency at least equal to that of a pneumatic tire and which overcomes all the undesirable features of the latter type of tires, inasmuch as the same is puncture-proof, needs no adjustment after being arranged on the wheel, is exceedingly long lived and which exerts practically the same tension throughout the circumference of the tire.

To the attainment of the foregoing the invention consists in the improvement as hereinafter described and definitely claimed.

Figure 1:
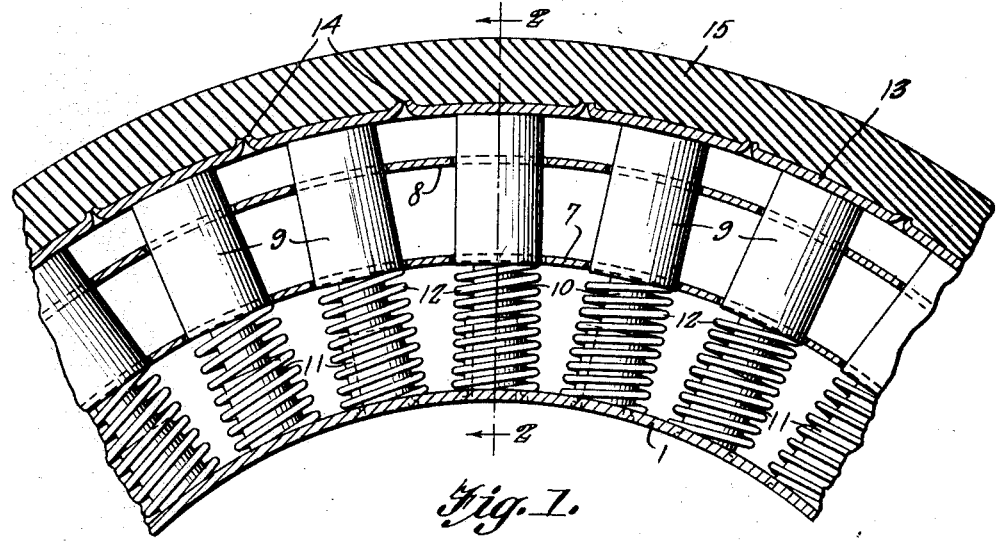
Figure 1 is an approximately central longitudinal sectional view through a spring tire in accordance with this invention.
Figures 2, 3:
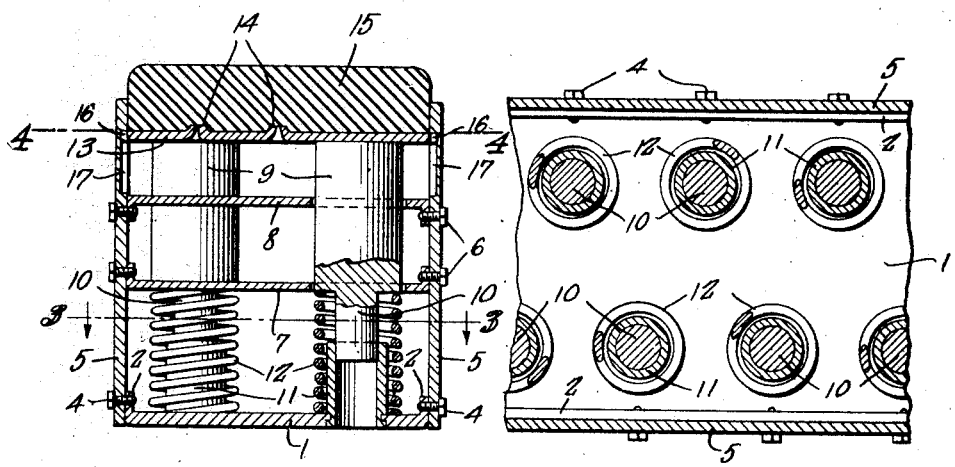
Figure 2 is a sectional view approximately on the line 2—2 of Figure 1.
Figure 3 is a sectional view approximately on the line 3—3 of Figure 2.
Figure 4:
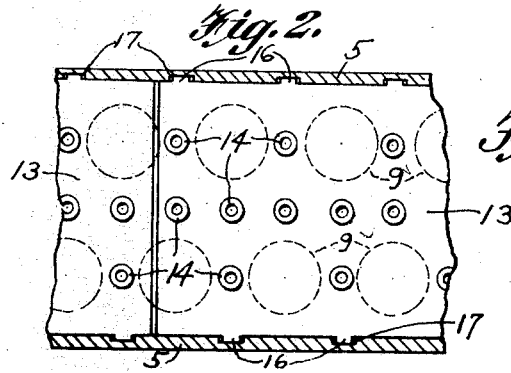
Figure 4 is a sectional view approximately on the line 4—4 of Figure 2.

The hollow body of the tire is preferably made up of sections to include an inner cylindrical ring 1 that is arranged over and fixed to the felly of a wheel. The inner member 1 of the tire has its edges provided with outwardly directed continuous flanges 2 and to these flanges there are secured by bolts or like removable means 4, the sides 5 of the tire. Between the sides 5 there are secured by removable means 6, the flanged edges of spaced cylindrical ring members 7 and 8, respectively. The members 7 and 8 provide spacer plates for the sides and also materially reinforce the sides, but in addition to this the members 7 and 8 are provided with equidistantly spaced round aligning openings through which are guided tubular members or plungers 9. These plungers have their inner ends provided with reduced cross sectionally rounded stems 10 that are received in sockets 11 which are preferably revolubly connected with the inner or base member 1 of the tire. Surrounding the sockets 11 and the stems 10 and exerting a pressure between the plungers 9 and the base 1 of the tire there are coil springs 12. On the outer end of the plungers 9 there are fixed arcuate plates 13. By reference to Figure 3 of the drawings it will be seen that the plungers are arranged in opposite circumferential series and that the plungers of one series are arranged in staggered relation with respect to the plungers of the second series, that is the plungers of one series are disposed approximately centrally between the plungers of the second series. The plates 13 are arranged end to end but are out of contact with each other. The plates have end and edge as well as central outwardly extending impinging elements 14, that enter the solid rubber tread 15 of the tire. The sides of the tread are received between the side plates 5 of the tire, and the plates 13 have their outer edges formed with lugs or projections 16 that are received in guide notches 17 on the inner faces of the side members 5 of the tire. The lugs contacting with the end walls of the notches limit the outward movement of the tread 15 through the influence of the springs 12 and likewise limit the inward movement of such tread.

The simplicity of my construction and the advantages thereof will, it is thought, be understood and appreciated by those skilled in the art to which the invention relates after the foregoing description has been carefully read in connection with the accompanying drawings but it is thought necessary to add that I do not wish to be restricted to the precise construction and details herein set forth and therefore hold myself entitled to such changes therefrom as fairly fall within the scope of what I claim.

Having described the invention, I claim:—

1. A tire for vehicle wheels, comprising a body member which is substantially U-shaped in cross section and which has outwardly extending sockets, transverse members connected to and bracing the sides of the tire, plunger members arranged in opposite staggeredly related series guided through said brace members, stems on the plungers received in the sockets, coil springs surrounding the sockets and urging the plungers in an outward direction, segmental plates fixed on the outer ends of the plungers, coengaging means between said plates and the inner sides of the tire for limiting the movement of the plates in both directions with respect to the tire and a solid rubber tread having its sides received between the sides of the tire and secured on said plates.

2. A tire for vehicle wheels comprising a cylindrical base ring having its edges flanged outwardly, flat annular side members bolted to the flanges of the base, cylindrical spacing and bracing rings for the sides removably secured thereto, plungers arranged in opposite and staggeredly related series guided through the last mentioned members and having inwardly projecting stems, swiveled sockets on the base of the tire in which the stems are received, coil springs surrounding the sockets and exerting a pressure between the base of the tire and the plungers, segmental plates fixed on the outer ends of the plungers, and having outwardly projecting lugs, the sides of the tire having guide grooves for the lugs, impinging elements on the segmental plates and a solid tread arranged over said plates, receiving the impinging elements therein and guided between the sides of the tire.

In testimony whereof I affix my signature.

JOHN SCHRANER.